UNITED STATES PATENT OFFICE.

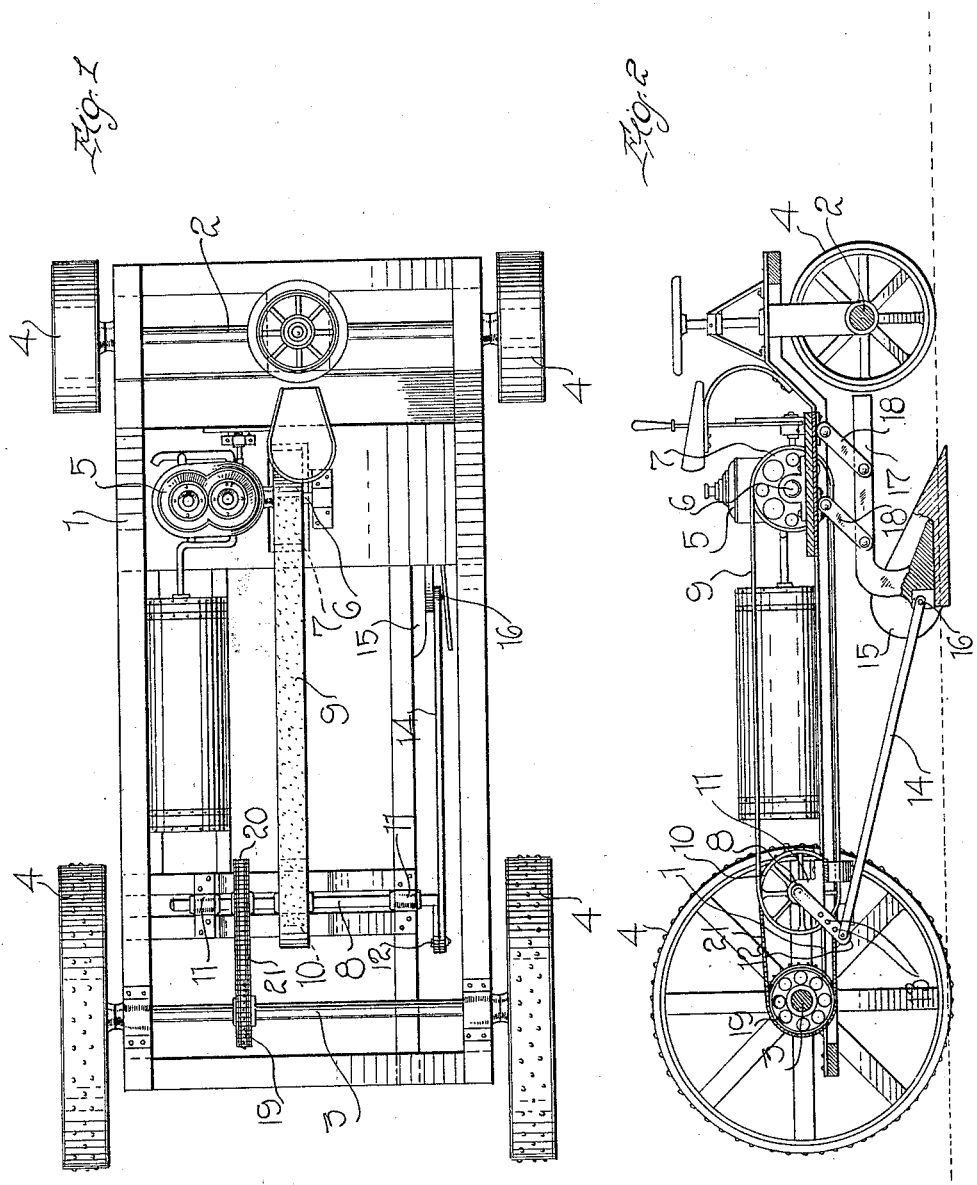

EARL G. KIMMEL, OF STOYESTOWN, PENNSYLVANIA.

PLOW.

1,141,965.  Specification of Letters Patent.  Patented June 8, 1915.

Application filed February 21, 1914. Serial No. 820,288.

*To all whom it may concern:*

Be it known that I, EARL G. KIMMEL, a citizen of the United States, residing at Stoyestown, in the county of Somerset and State of Pennsylvania, have invented certain new and useful Improvements in Plows, of which the following is a specification, reference being had to the accompanying drawings.

This invention relates to new and useful improvements in plows and more particularly to what is known as a reciprocating plow, the main object of the invention being the provision of a plow of the traction type, whereby means is provided and connected to the plow for imparting a reciprocating movement to the same in addition to the pulling power which is generally applied to plows of various types.

Another object of the present invention is the provision of a plow of this character which will possess advantages in points of efficiency and durability, is inexpensive to manufacture and one which will be very efficient and useful in operation.

With the above and other objects in view, the invention consists in the novel features of construction, combination and arrangement of parts as will be hereinafter referred to and more particularly pointed out in the specification and claim.

In the accompanying drawings forming a part of this application, Figure 1 is a top plan view of a plow constructed in accordance with my invention; and Fig. 2 is a longitudinal sectional view of the same.

In carrying out my invention, I prefer to use the same as a traction plow and, to this end, I provide a frame 1 which is mounted upon rear or traction axle 3 and a forward or steering axle 2. Mounted upon the outer ends of said axles are the wheels 4, whereby the frame may be readily transported from place to place and the power for transportation applied through the medium of a motor 5, which may be in the form of a gasolene or any other form of engine. Connected to the motor 5, is the engine shaft 6, upon one end of which is mounted a pulley 7. The pulley 7 is connected with the drive shaft 8, through the medium of a belt 9 which is adapted to pass around a pulley 10 mounted upon the drive shaft and around the pulley 7. From this, it will be apparent that upon rotary movement of the engine or shaft 6, movement will be imparted to the drive shaft 8.

The drive shaft 8 is rotatably mounted within suitable bearings 11 supported by the frame 1 and supported upon one end of the drive shaft is a crank arm 12, said crank arm being provided with a plurality of openings 13 which are arranged in alinement and extend from the outer end of the arm inwardly toward the shaft 8. Pivotally connected to the arm 12, is one end of a pitman rod 14, the other end of which is pivotally connected to the plow 15 by means of the bolt 16. From this, it will be apparent that upon rotary movement of the drive shaft 8, reciprocating movement will be imparted to the plow 15.

The plow 15 is provided with the usual form of beam 17 and is connected with the frame 1 by means of links 18 18. It will be noted that the links 18 are pivotally connected to the plow beam and the frame so that in addition to the reciprocating movement which is imparted to the plow, through the medium of the pitman 14, the regular pulling power may be applied.

It will be apparent that by providing the crank arm 12, with a plurality of openings 13, the stroke of the plow may be readily adjusted by moving the inner end of the piston toward the shaft 8 or away from the same. It will be apparent from the construction that in the device, as illustrated in Fig. 2 the stroke of the plow will be much longer and slower than if the inner end of the pitman were connected to the crank arm nearer the shaft 8 and by moving the inner end of the pitman inwardly over the crank arm and connecting the same thereto, adjacent the shaft, the stroke will be much shorter and quicker. It will be apparent that in the use of my improved plow, the soil will be more thoroughly pulverized than by the use of the usual power drawn plows. It will also be apparent that by providing the reciprocating movement to the plows, vines, entangled weeds and other obstructions will be more readily broken away than by the regular straight pulling of the plow.

It is to be understood that while I have shown and described the preferred manner of imparting reciprocating movement to the plow, various changes in the details of construction may be resorted to and various types of engines or motors may be employed for the motive power and for driving the traction axle 3. In the accompanying drawings, movement is imparted to the frame by providing a sprocket 19 on the traction axle 3 and connecting the same with a similar sprocket 20 on the drive shaft 8, by means of a sprocket chain 21. From this, it will be apparent that upon the forward movement of the frame 2, the reciprocating movement of the plow will be uniform with the forward movement of the frame. It will be apparent from the accompanying drawings, taken in connection with the description given herewith, that my device is extremely simple in construction and can be manufactured at a comparatively low cost. While I have shown and described my improved plow as employed in connection with a traction frame, it will be apparent that the same may be used upon regular draft plows, that is, plows which are provided with a traction frame, such as illustrated in the accompanying drawings.

While I have shown and described the preferred form of my invention, it will be obvious that various changes in the details of construction and in the proportions may be resorted to for successfully carrying my invention into practice without sacrificing any of the novel features or departing from the scope of the appended claim.

Having thus described this invention, what I claim is:—

A plow, embodying a wheel supported frame, a motor mounted thereon, a shaft rotatably mounted adjacent the rear end of the frame and driven from the motor, a crank arm carried by the shaft provided with a plurality of alined openings, a plow including a beam, a pitman rod having one end connected in one of the openings of the crank arm and the other end pivotally connected with the plow, and links having one end pivotally connected to the frame and the other end pivotally connected to the plow beam, said links being of equal length, whereby the plow is caused to reciprocate in a horizontal plane.

In testimony whereof I hereunto affix my signature in the presence of two witnesses.

EARL G. KIMMEL.

Witnesses:
JOHN R. MONG,
DAVID KIMMEL.

Copies of this patent may be obtained for five cents each, by addressing the "Commissioner of Patents, Washington, D. C."